Patented Nov. 6, 1928.

1,690,150

UNITED STATES PATENT OFFICE.

WILLIAM B. WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS.

METHOD OF USING LATEX AND PRODUCT THEREOF.

No Drawing. Application filed November 25, 1927. Serial No. 235,754.

This invention relates to methods of using latex; and it comprises a process of thickening latex and depriving it of its free mobility without injury to its other properties wherein thickening is produced by the action of zinc oxid on hemoglobin dissolved in said latex; all as more fully hereinafter set forth and as claimed.

Latex from the Hevea tree occurs in commerce as a thin, mobile, milky liquid carrying about 30 per cent rubber. This rubber is present in a form which is, for all practical purposes, equivalent to an aqueous solution. Actually, however, the contained rubber, except for a minimal amount of finely divided coagulate ("cream") is present as excessively minute suspended globules in Brownian motion; but the latex (with the noted exception) behaves like a true solution; the liquid passing readily through filter paper and entering pores and capillaries, carrying rubber with it. It can therefore be used in making articles impregnated with rubber; something which is not practicable with other forms of rubber. Latex is also useful in making articles containing distributed long fiber and for many other purposes. In these uses, sometimes the rubber is separated in coagulated form and sometimes in gelled form. The two forms are quite different in properties and each has advantages for different purposes.

For many purposes the great mobility and thinness of latex are not desirable; and it would be advantageous to thicken it somewhat if this could be done without forfeiture of other valuable properties. For example it is difficult to distribute small amounts of fiber or fillers in a large amount of latex. Segregation occurs. In making shoe tread stock with distributed reinforcing fiber a rubber: fiber ratio of 75:25 is desirable while fiber will not take up and hold against draining more than once or twice its weight of latex. With 30 per cent latex this means a final rubber: fiber ratio of 23:77 to 36:64; far below the ratio wanted. Heavy fillers cannot be mixed with more than the wetting amount of latex.

Many propositions have been made looking toward thickening latex, the use of glue, casein, soaps, etc., etc. But without exception these propositions have involved the use of something which injured the latex or was undesirable in rubber compositions. Glue, for example, to produce any substantial thickening of latex must be used in quantities quite undesirable in the final rubber composition.

It is the purpose of the present invention to provide the desirable thickening without the use of substances undesirable in rubber compounds and without detriment to the other properties of the latex. To this end, I utilize a new and peculiar reaction between two bodies which are desirable components of rubber compositions; zinc oxid and hemoglobin. Zinc oxid is a desirable component of most rubber articles and, in the small proportions which may be used in the present invention, is not objectionable in any. Hemoglobin is a desirable addition to latex.

Hemoglobin is a commercial product, being made by the centrifugal separation of blood into its constituents. It is what is called the "red end." Hemoglobin is a proteid of unique properties and, as I have found, is an excellent binder in making plastics under proper conditions. Used as a binder under such conditions it is set or hardened by heat and pressure; the temperatures and pressures being about those required in vulcanizing rubber. When occurring in rubber compositions, hemoglobin in many cases gives increased tensile strengths; this probably being due to the good cohesive union it forms with many mineral fillers. In solution in latex it acts as a protective colloid, shielding the latex against coagulation and enabling the use of latex to be extended to various materials with which its use is now difficult. Commercial ammoniacal latex is coagulated on contact with many common materials, such as old rubber in tire scrap, commercial asbestos, carbon black, etc., etc. A small amount of hemoglobin in the latex protects it against coagulation by these bodies.

I have found that upon admixture of a hemoglobin solution, say, of 30 per cent concentration, with a small amount of zinc oxid, say, about 5 per cent, under certain conditions there results a comparatively quick interaction with a peculiar change in the physical properties of the solution. It is not coagulation or gelatinization, in the sense of forming microscopically apparent gel bodies; but the solution is rendered less mobile, and is, so to speak, thickened. It is given a batter-like consistency and when thus immobilized, it may be readily and uniformly mixed with all sorts of fillers; or, if these fillers be in admixture at the time of change, they do not thereafter tend to settle out, even in the case of heavy mineral matters. But slight stirring is required to give uniform and permanent distribution. By proper control of conditions, the reaction may be caused to take place at will. Up to the time of reaction, that is, before the action occurs, the hemoglobin solution is not changed in consistency save in so far as the presence of a small amount of distributed mineral matter is concerned, and it is freely miscible with other aqueous solutions. How much of the added zinc oxid takes part in the new reaction is not at present known. The action takes place but slowly if the hemoglobin solution and the zinc oxid are merely in contact, the zinc oxid simply settling out, but it takes place at once with rapid stirring. Heating to 75° or 100° F. also causes the action. Zinc oxid which has been thoroughly wet with water is more efficient in the present action than dry zinc oxid. As to the nature of the actions taking place between hemoglobin and zinc oxid, I express no opinion; contenting myself with noting the observed fact. The action appears to be specific to the two substances and is not altered or affected by other materials which may be in solution or suspension. It takes place as readily in latex as it does in water; and while the latex is thereby given a thick batter-like consistency, it is not coagulated. The latex retains its normal properties otherwise. Immobilization of latex containing hemoglobin and zinc oxid may be produced at will by warming the solution or by violently agitating it. Up to the time of the institution of the reaction the mixture retains its normal liquidity. Thickening may be effected before or after the latex is brought into contact with the fibers or fillers to be used in the final composition; a fact which leads to various convenient modifications of my process. When the batter-like consistency is once produced even heavy fillers like litharge do not tend to settle out and their uniform distribution in the mass is practicable.

In one convenient modification of my method in making abrasive articles, diluted latex receives an addition of about 5 per cent hemoglobin on the rubber and is mixed with abrasives ground to the proper fineness. The hemoglobin protects the latex against coagulation in the operation. The amount of rubber used in making such articles as abrasive wheels is sufficient to produce 10 or 12 per cent rubber in the finished article. Water is added in proportions allowing convenient admixture. About 2 per cent zinc oxid on the rubber is now added and active stirring performed. The zinc oxid and hemoglobin convert the latex into the described batter-like composition and in this stirring even distribution of the abrasive vulcanizing agents and of the latex are effected. The mass may now be rough molded, and dried; after which it is vulcanized under heat and pressure in the usual way. Sulfur to the amount desired in vulcanization may be incorporated at the time of mixing, as may accelerators. In the presence of hemoglobin sulfur disperses readily and uniformly throughout the latex. Drying is best done at a temperature not above 150° F. by a current of conditioned air.

In using abrasives coarser than about 60 mesh, it is useful to employ a little fine asbestos to go into the intergranular voids.

In the above example fine fiber asbestos in equal amount may be substituted for the abrasive to produce rubber-bonded asbestos shapes.

In applying the thickened latex of the present invention to cords, threads and fabric, the particular way of operation varies according to the results wanted. Where permeation of the cord by the latex to produce incorporated rubber is wanted, the addition of the zinc oxid is postponed until after the required degree of penetration is attained. On the other hand, if the cords are to be merely coated with rubber without interior penetration, the zinc oxid is added to the latex and reaction produced before contacting with the fiber. Where a graded penetration is wanted, latex containing hemoglobin is brought into contact with the cords or fabric and after some penetration is effected the zinc oxid is stirred into the mixture, immobilizing the latex on the exterior of the cord.

The described action seems to be specific to hemoglobin and to zinc oxid. Other proteids than hemoglobin do not react with zinc oxid to the same extent. Blood serum or egg albumen, for example, does not exhibit the action in any sufficient degree to make it practically available for the present purposes. Zinc oxid appears to be the only cheap and readily available mineral material which has the action on hemoglobin here in question. There are however various dyes, such as nigrosin, which have much the same effect on hemoglobin.

The present invention is particularly useful where small amounts of fiber or of filler are to be distributed throughout a relatively large mass of rubber or of rubber composition. As stated, even the heaviest fillers do not settle out of the batter-like composition. In making such compositions only part of the rubber may come from the latex since the protective action of the hemoglobin allows large quantities of old rubber to be incorporated without coagulating the latex. Artificially dispersed rubber may be added to the latex. Similarly, large amounts of rubber surrogate can be incorporated. It is possible by the present invention to utilize the valuable properties of latex rubber in rubber compositions in which such latex rubber is only a minor fraction, the rest being reclaimed rubber, rubber waste, rubber substitute, etc.; and such compositions may contain any proportion of filler or of fiber or of both, in uniform distribution. The hemoglobin protects latex against coagulation and the effect of the zinc oxide on the hemoglobin is to thicken the whole composition to a degree sufficient to permit convenient incorporation.

In most of the articles made under the present invention the final bond is gelled rubber. A bonded coagulation rubber can be produced by various expedients but it is not as convenient nor, for most purposes, is it as desirable. By the use of the batter-like latex composition described, materials analogous to frictioned fabrics may be produced with a better bonding between the rubber layer and the fabric layer. Penetration of rubber into the fabric may be allowed to take place merely to the extent necessary for a good bond. In such an embodiment of the present process, a rubber compound of the proper composition containing fillers, sulfur, accelerator, etc. and also containing hemoglobin and zinc oxid is thickened by the agitation of mixing and is distributed on a moving band of asbestos or other fabric. Subsequent operations are as usual. While I regard the use of the new reaction between hemoglobin and zinc oxid to be particularly advantageous in connection with latex it has advantages in other relations. The reaction being to a large extent independent of other binders or fillers which may be present, the thickening action may be utilized in connection with a wide variety of dissolved binders. As already stated, hemoglobin itself is a good binder for manufacturing plastic materials and in another application Serial No. 201,207, filed June 24, 1927, I have disclosed and claimed various processes utilizing its properties in this respect. On admixture of a hemoglobin solution with wood flour and drying in conditioned air to certain sub-atmospheric moisture contents, the mixture is capable of being molded under heat and pressure to give plastics of high tensile strength and good appearance. In this action the presence of zinc oxid is advantageous, making a number of specific differences in the result. For one thing, with zinc oxid in the composition it is possible to admix a certain amount of formaldehyde with a proctein, particularly hemoglobin, to increase the water resistivity of the product, without however adversely affecting the bond produced by the final heat curing operation. With the presence of formaldehyde, under these conditions, final products of quite extraordinary tensile strength may be obtained. I regard utilization of the specific action of zinc oxid on hemoglobin solution, in whatever it may be utilized, as within my invention.

What I claim is:

1. In the thickening of binders for plastic materials the process which comprises producing a reaction between hemoglobin in solution and zinc oxid.

2. In the thickening of latex the process which comprises adding hemoglobin and zinc oxid to said latex and causing a reaction to take place.

3. In the thickening of latex the process which comprises adding hemoglobin to said latex, thereafter adding zinc oxid and causing a reaction to take place.

4. In the manufacture of composite articles bonded by rubber derived from latex the process which comprises adding hemoglobin and zinc oxid to latex, thickening the mixture by the action of said zinc oxid on said hemoglobin and thereafter incorporating other materials intended to form the body of the final article.

5. In the manufacture of composite articles bonded by rubber derived from latex, the process which comprises adding hemoglobin to latex, incorporating other materials intended to form the body of the final article, and thickening the mixture by the action of zinc oxid on said hemoglobin.

6. In the manufacture of rubber bonded abrasive articles the process which comprises adding hemoglobin and zinc oxid to latex, thickening the solution by the action of said zinc oxid on said hemoglobin, incorporating fine grained abrasive into the thick liquid body so produced and drying.

7. A plastic composition containing the product of reaction between hemoglobin and zinc oxid.

8. A plastic composition containing the product of reaction between hemoglobin, formaldehyde and zinc oxid.

In testimony whereof, I have hereunto affixed my signature.

WILLIAM B. WESCOTT.